US008108012B1

(12) United States Patent
Prock et al.

(10) Patent No.: US 8,108,012 B1
(45) Date of Patent: Jan. 31, 2012

(54) METHODS AND SYSTEMS FOR INCREASING AND DECREASING A POWER LEVEL OF A FORWARD-LINK OVERHEAD CHANNEL

(75) Inventors: John W. Prock, Peculiar, MO (US); Anoop K. Goyal, Overland Park, KS (US); Bhagwan Khanka, Lenexa, KS (US); Hemanth Balaji Pawar, Herndon, VA (US); Shilpa Kowdley Srinivas, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 511 days.

(21) Appl. No.: 12/402,282

(22) Filed: Mar. 11, 2009

(51) Int. Cl.
*H04B 1/38* (2006.01)
(52) U.S. Cl. ........................................ 455/571; 455/522
(58) Field of Classification Search .................. 455/571, 455/63.1, 63.2, 522, 517, 510, 513
See application file for complete search history.

(56) References Cited

U.S. PATENT DOCUMENTS

| | | | | |
|---|---|---|---|---|
| 7,079,523 B2* | 7/2006 | Nelson et al. | ................. | 370/342 |
| 7,145,964 B2* | 12/2006 | Hoffmann et al. | ............ | 375/298 |
| 7,636,322 B1* | 12/2009 | Gandhi et al. | ................ | 370/252 |
| 2002/0080024 A1* | 6/2002 | Nelson | .......................... | 340/503 |
| 2007/0206542 A1* | 9/2007 | Proctor | .......................... | 370/335 |

\* cited by examiner

*Primary Examiner* — Don Le

(57) ABSTRACT

Methods and systems are provided for increasing and decreasing a power level of a forward-link overhead channel. In an embodiment, a BTS (i) receives from at least one mobile station an increase request, each increase request requesting that the BTS increase a power level of a forward-link overhead channel, (ii) makes a first determination that at least a first threshold number of mobile stations have sent an increase request within a first request window, wherein the first request window is a period of time, and (iii) in response to making the first determination, increases the power level of the forward-link overhead channel.

25 Claims, 5 Drawing Sheets

METHODS AND SYSTEMS FOR INCREASING AND DECREASING A POWER LEVEL OF A FORWARD-LINK OVERHEAD CHANNEL

BACKGROUND

A mobile station, such as a cell phone or a personal digital assistant (PDA), may be used to communicate with a cellular wireless network. The mobile station typically communicates with the network over a radio-frequency (RF) air interface according to a wireless communication protocol such as Code Division Multiple Access (CDMA), perhaps in conformance with one or more industry specifications such as IS-95 and IS-2000. A wireless network that operates according to these specifications is also referred to as "1xRTT (1x) network," which stands for "Single Carrier Radio Transmission Technology". Such a network (referred to herein as a "CDMA network") typically provides communication services such as voice, Short Message Service (SMS) messaging, and packet-data communication.

A typical CDMA network includes a plurality of base stations, each providing one or more wireless coverage areas—for example, one or more sectors. When a mobile station is positioned in a sector, it can communicate over the RF air interface with the base station, and in turn over one or more circuit-switched and/or packet-switched signaling and/or transport networks to which the base station provides access. The base station and the mobile station conduct these communications over a frequency known as a carrier. A base station may provide service in a sector on one carrier, or on more than one carrier. A given instance of a given carrier in a given sector may be referred to herein as a "sector/carrier."

Communication, including voice and packet-data communication, between the mobile station and the base station is separated into forward-link communication (from the base station to the mobile station) and reverse-link communication (from the mobile station to the base station). Each carrier over which this communication takes place is typically a pair of distinct frequencies—one for the forward link and the other for the reverse link. This approach is known as frequency division duplex (FDD).

In a typical CDMA network, using a configuration known as radio configuration 3 (RC3), a base station can, on each sector/carrier, transmit forward-link data on a maximum of 64 distinct channels at any given time. Each of these 64 channels corresponds to a unique 64-bit code known as a Walsh code. Of these, typically, 61 channels are available for use as traffic channels (to carry user data). The other 3 channels—the pilot channel, the paging channel, and the sync channel—are used for administrative functions and are generically referred to as overhead channels. The transmitting power of a base station on a given sector/carrier is divided among the pilot, paging, and sync channels, and among the mobile stations to which the base station is transmitting voice data and/or packet data on traffic channels.

In general, the pilot channel functions to alert mobile stations in a given sector of the presence of a service-providing base station. Typically, the pilot channel conveys a value known as a pseudorandom number (PN) offset, which identifies the sector; in particular, by being offset from CDMA system time by a certain amount of time, the pilot channel conveys the PN offset. Mobile stations generally use the pilot channel to coherently detect and demodulate the signal on a given sector/carrier. The paging channel is typically used to transmit overhead messaging, such as incoming-call and message-waiting pages, as well as SMS messages, to mobile stations. The paging channel typically also broadcasts values known as the system identification code (SID) and the network identification code (NID), which, taken together, help identify a given sector. The sync channel generally provides information that enables the base station and mobile stations to be precisely synchronized on CDMA system time. A mobile station "acquires" a cellular wireless network by, among other things, detecting the pilot channel of the sector/carrier and by reading the synchronization information from the sync channel and the overhead messaging information from the paging channel.

When a base station instructs a mobile station to use a particular traffic channel for a particular communication session, the base station does so by instructing the mobile station to tune to a particular one of those 64-bit Walsh-coded traffic channels. It is over that assigned traffic channel that the base station will transmit forward-link data to the mobile station during the ensuing communication session. Note that, in addition to including the forward-link channel, the traffic channel also includes a corresponding Walsh-coded reverse-link channel, over which the mobile station transmits data to the base station. These traffic channels may be used for different types of communication, among which are second-generation (2G) voice, 2G data, third-generation (3G) voice, and 3G data.

SUMMARY

Methods and systems are provided for increasing and decreasing a power level of a forward-link overhead channel. In an embodiment, a BTS (i) receives from at least one mobile station an increase request, each increase request requesting that the BTS increase a power level of a forward-link overhead channel, (ii) makes a first determination that at least a first threshold number of mobile stations have sent an increase request within a first request window, wherein the first request window is a period of time, and (iii) in response to making the first determination, increases the power level of the forward-link overhead channel.

Another embodiment comprises a mobile station (i) making a first determination that a reception level of a forward-link overhead channel of a BTS serving the mobile station is less than a minimum reception level, and (ii) in response to making the first determination, sending to the BTS a request to increase a power level of the forward-link overhead channel.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF THE DRAWINGS

1. Overview

Figure 1:
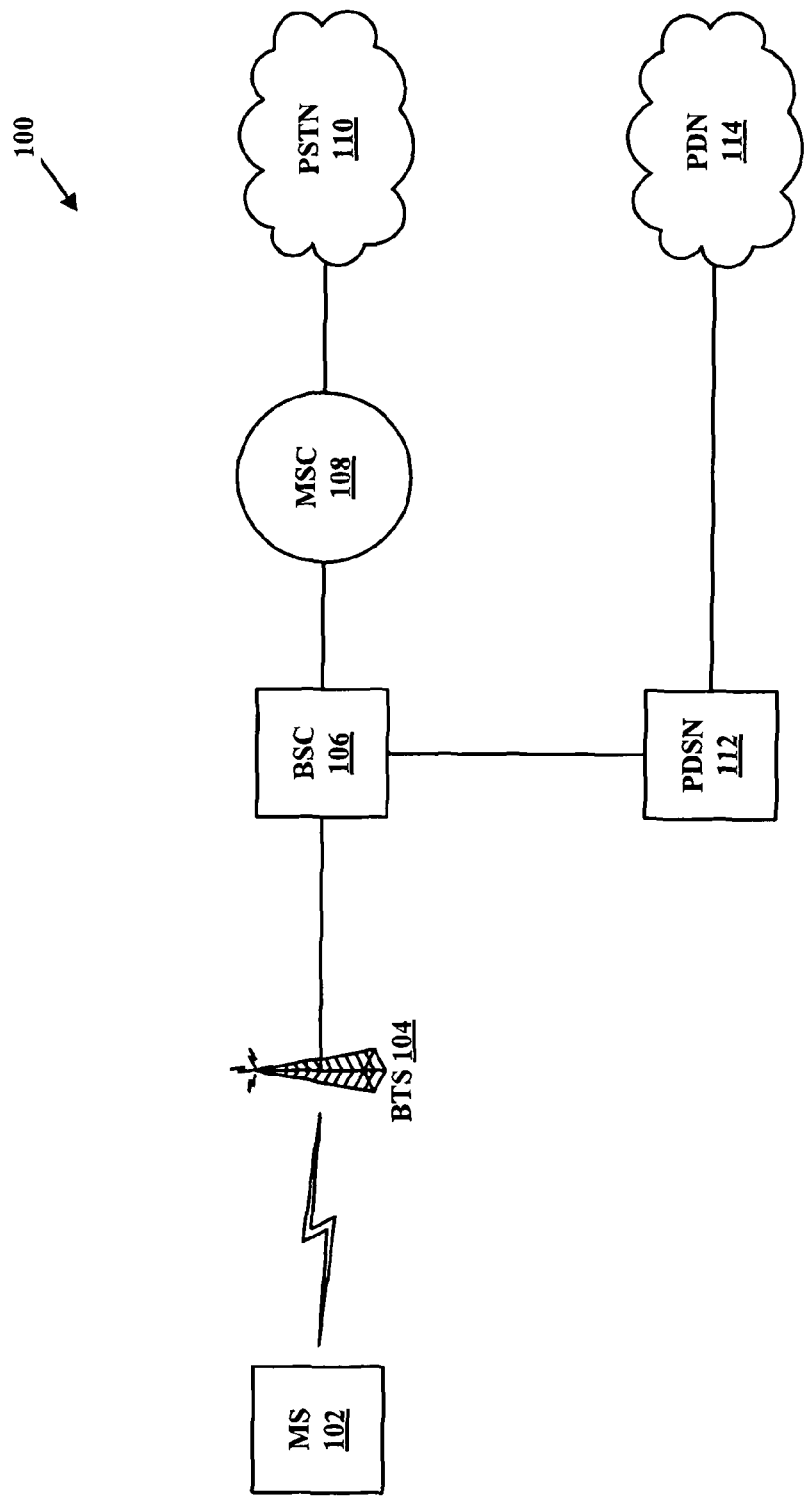
FIG. 1 is a simplified block diagram of a communication system, in accordance with exemplary embodiments.

A mobile station may not be able to acquire a cellular wireless network if it is unable to receive a signal of a forward-link overhead channel of a BTS. One reason that a mobile station may not be able to receive the signal is that the power level of the signal may be too low given current operating conditions. For example, certain obstructions such as buildings may degrade the signal of the channel such that, by the time the signal reaches the mobile station, the signal is so weak that it cannot be properly received by the mobile station. Additionally or alternatively, the signal power of the channel may degrade as the signal travels over longer distances such that the signal power of a channel received by a mobile station further from the BTS may be less than the signal power of a channel received by a mobile station closer to the BTS. Therefore, it would be desirable for a mobile station, if it cannot receive the signal of a forward-link overhead channel because the signal power is too low, to be able to send a message to the BTS to increase the power level of the signal.

Among the focuses of the present invention is for a BTS (i) to receive from at least one mobile station an increase request, each increase request requesting that the BTS increase a power level of a forward-link overhead channel, (ii) to make a first determination that at least a first threshold number of mobile stations have sent an increase request within a first request window, wherein the first request window is a period of time, and (iii) in response to making the first determination, to increase the power level of the forward-link overhead channel. It should be understood that a reference to a power level of a channel is a reference to the power level of a signal for the channel. The forward-link overhead channel may be, for example, a forward-link sync channel and/or a forward-link paging channel. Those having skill in the art will recognize, however, that the forward-link overhead channel is not limited to the exemplary sync and paging channels.

In an exemplary embodiment, the first threshold number may be one. In another exemplary embodiment, wherein the BTS provides service over a sector/carrier and wherein receiving an increase request comprises receiving an increase request from a mobile station being served on the sector/carrier, the first threshold number may be half of a number of all mobile stations being served on the sector/carrier. The first request window might be, for example, five-hundred milliseconds. Those having skill in the art will recognize that any other first threshold number and/or first request window may be suitable without departing from the scope of the claims.

In an exemplary embodiment, increasing the power level may comprise increasing the power level by a half decibel. Or increasing the power level may comprise, for example, doubling the power level. In another exemplary embodiment, increasing the power level may be conditioned on not exceeding a maximum power level. Those having skill in the art will recognize that other methods of increasing the power level are possible without departing from the scope of the claims.

Another focus of the present invention is for the BTS (i) to receive from at least one mobile station a decrease request, each decrease request requesting that the BTS decrease the power level of the forward-link overhead channel, (ii) to make a second determination that at least a second threshold number of mobile stations have sent a decrease request within a second request window, wherein the second request window is a period of time; and (iii) in response to making the second determination, to decrease the power level of the forward-link overhead channel. It should be noted that the use of "first determination" and "second determination" is not intended to represent the order that the determinations should be made, but is intended to distinguish the determinations.

Another focus of the invention is for a BTS to determine that less than a second threshold number of mobile stations have sent an increase request within a second request window, wherein the second request window is a period of time, and to responsively set the power level of the forward-link channel to a default setting. In an exemplary embodiment, the second threshold number is less than the first threshold number.

Another aspect of the invention is for a mobile station (i) to make a first determination that a reception level of a forward-link overhead channel of a BTS serving the mobile station is less than a minimum reception level, and (ii) in response to making the first determination, to send to the BTS a request to increase a power level of the forward-link overhead channel. The forward-link overhead channel may be, but is not limited to, a forward-link sync channel and/or a forward-link paging channel. Further, the mobile station may (i) make a second determination that the reception level of a forward-link overhead channel of a BTS serving the mobile station is greater than a maximum reception level, and (ii) in response to making the second determination, send to the BTS a request to decrease the power level of the forward-link overhead channel.

It should be understood that all descriptions presented herein are exemplary in nature. Those having skill in the art will recognize that the invention may be carried out in any manner without departing from the scope of the claims.

1. Exemplary Architecture a. An Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a base transceiver station (BTS) 104, a base station controller (BSC) 106, a mobile switching center (MSC) 108, a public switched telephone network (PSTN) 110, a packet data serving node (PDSN) 112, and a packet-data network (PDN) 114. And additional entities could be present, such as additional mobile stations in communication with BTS 104, additional BTSs in communication with BSC 106, and additional BSCs in communication with MSC 108, etc.; furthermore, there could be additional entities in communication with PSTN 110 and/or PDN 114. Also, there could be one or more devices and/or networks making up at least part of one or more of the communication links. For example, there could be one or more routers, switches, or other devices or networks on the link between PDSN 112 and PDN 114. And PSTN 110 and PDN 114 may be connected via one or more gateways and/or other devices. And other variations and/or additions are possible as well.

Mobile station 102 may be any mobile device arranged to carry out the mobile-station functions described herein. Mobile station 102 is further described in connection with FIG. 2.

Note that the combination of BTS 104 and BSC 106 may be considered—and referred to herein as—a base station. However, BTS 104 or BSC 106 could, taken alone, be considered a base station as well. Furthermore, a base station may be considered to be either or both of those devices, and perhaps make use of one or more functions provided by MSC 108, PDSN 112, and/or any other entity, without departing from the scope or spirit of the present invention.

BTS 104 may be any network element arranged to carry out the BTS functions described herein. As such, BTS 104 may include a communication interface (such as a wireless-communication interface), a processor, and data storage comprising instructions executable by the processor to carry out those BTS functions. The communication interface may include one or more antennas, chipsets, and/or other components for providing one or more CDMA (and/or another protocol) coverage areas such as cells and sectors, for communicating with mobile stations, such as mobile station 102, over an air interface. The communication interface may also include one or more wired and/or wireless interfaces for communicating with at least BSC 106. As an example, a wired Ethernet interface may be included.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least BTS 104, MSC 108, and PDSN 112. In general, BSC 106 functions to control one or more BTSs such as BTS 104, and to provide one or more BTSs such as BTS 104 with connections to devices such as MSC 108 and PDSN 112.

MSC 108 may be any networking element arranged to carry out the MSC functions described herein. As such, MSC 108 may include a communication interface, a processor, and data storage comprising instructions executable by the processor to carry out those MSC functions. The communication interface may include one or more wired and/or wireless interfaces for communicating with at least BSC 106 and PSTN 110. In general, MSC 108 functions as a switching element between PSTN 110 and one or more BSCs such as BSC 106, facilitating communication between mobile stations and PSTN 110, which may be the well-known public switched telephone network.

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and PDN 114. In general, PDSN 112 functions as a network access server between PDN 114 and BSCs such as BSC 106, facilitating packet-data communication between mobile stations and PDN 114.

PDN 114 may include one or more wide area networks, one or more local area networks, one or more public networks such as the Internet, one or more private networks, one or more wired networks, one or more wireless networks, and/or one or more networks of any other type. Devices in communication with PDN 114 may exchange data using a packet-switched protocol such as the Internet Protocol (IP), and may be identified by an address such as an IP address.

b. An Exemplary Mobile Station

Figure 2:
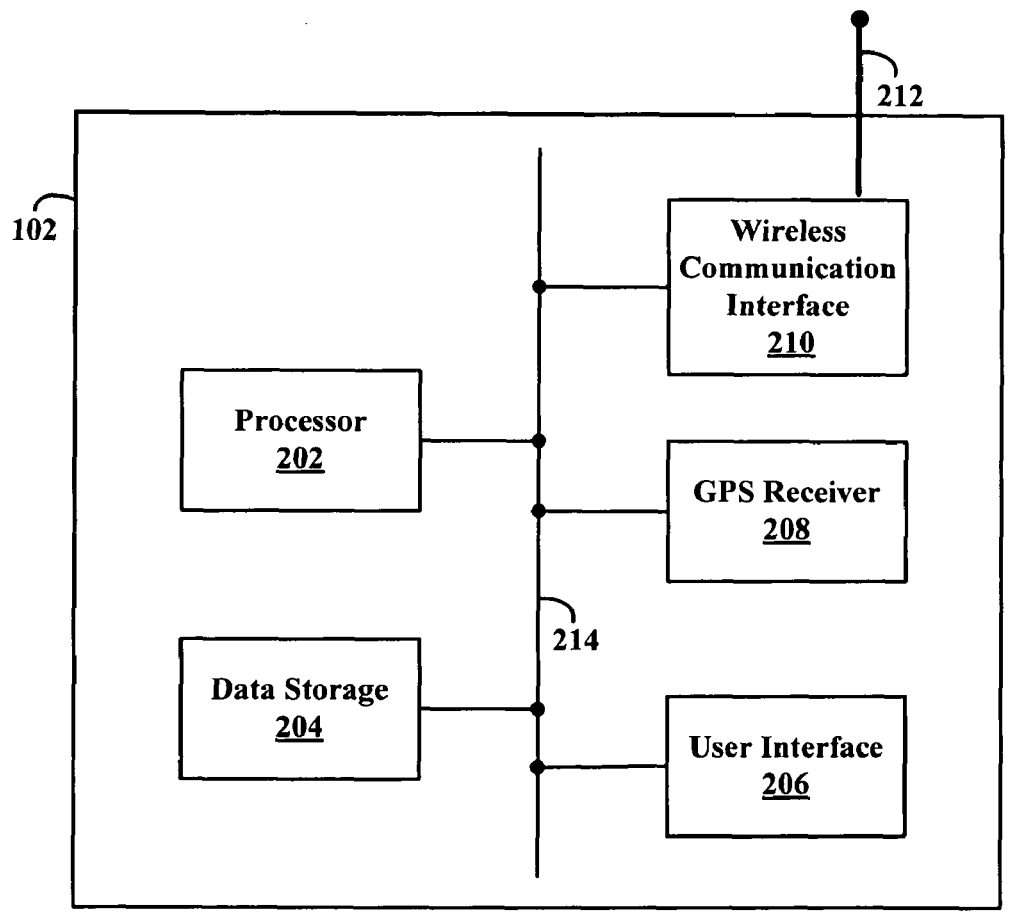
FIG. 2 is a simplified block diagram of a mobile station, in accordance with exemplary embodiments.

FIG. 2 is a simplified block diagram of an exemplary mobile station, which may be used in accordance with exemplary embodiments. As illustrated, mobile station 102 may include a processor 202, data storage 204, a user interface 206, and/or a wireless communication interface 210, all coupled together by a system bus 214. In addition, mobile station 102 may include a global positioning system (GPS) receiver 208, which may be any known or hereafter-developed GPS receiver, suitable for receiving and decoding GPS signals for location and timing purposes, perhaps among other purposes. Further, mobile station 102 may include any other mechanisms now known or later developed for such devices.

In an exemplary embodiment, processor 202 may be, for example, a general purpose microprocessor and/or a discrete signal processor. Though processor 202 is described here as a single processor, those having skill in the art will recognize that mobile station 102 may contain multiple (e.g., parallel) processors. Data storage 204 may store a set of machine-language instructions, which are executable by processor 202 to carry out various functions described herein. Alternatively, some or all of the functions could instead be implemented through hardware. In addition, data storage 204 may store various data to facilitate carrying out various functions described herein. In addition, data storage 204 may hold user-interface data, among many other possibilities. User interface 206 may function to facilitate interaction with a user of the mobile station. As such, user interface 206 may include a display, a speaker, a microphone, a key input, a touch-screen, and/or any other elements for receiving inputs and communicating outputs.

Wireless communication interface 210 may include a chipset suitable for communicating with one or more devices over antenna 212. The chipset could be suitable for CDMA communication. The chipset or wireless-communication interface 210 in general may also or instead be able to communicate with other types of networks and devices, such as EV-DO networks, Wi-Fi networks, Bluetooth devices, and/or one or more additional types of networks and devices.

2. Exemplary Operation a. Base Transceiver Station

Figure 3:
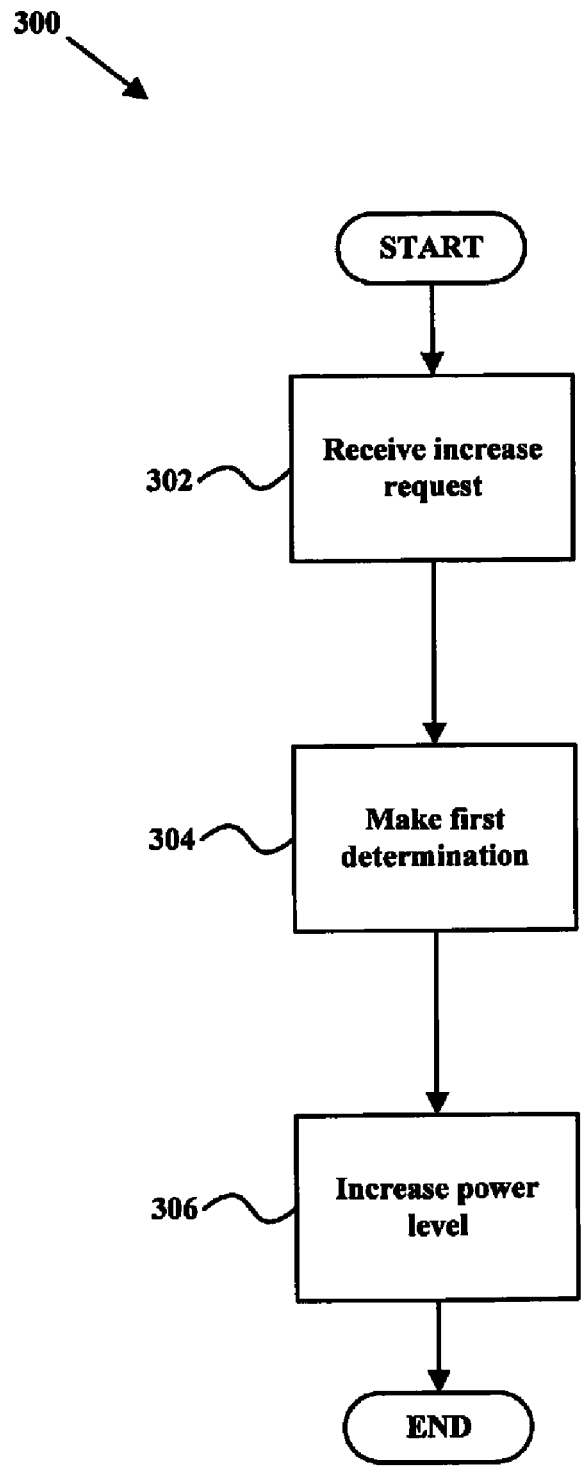
FIG. 3 is a flowchart of a method, in accordance with exemplary embodiments.

FIG. 3 depicts a flowchart of a method, in accordance with exemplary embodiments. As shown in FIG. 3, method 300 begins at step 302 with the BTS receiving from at least one mobile station an increase request. The BTS could be, for example, BTS 104 depicted in FIG. 1. The mobile station could be mobile station 102 depicted in FIG. 1. In addition, there may be additional mobile stations served by BTS 104, and the BTS may receive an increase request from any of these mobile stations as well.

The forward-link overhead channel may be, for example, a forward-link sync channel and/or a forward-link paging channel. Those having skill in the art will recognize, however, that the forward-link overhead channel is not limited to the exemplary sync and paging channels.

The increase request is a request that the BTS increase a power level of a forward-link overhead channel. The increase request might be received, for example, over an access channel or any other channel suitable for receiving an increase request. Further, the increase request need not be received over an overhead channel, nor does the increase request need to be received over a "channel," but can instead be received in any manner suitable for receiving an increase request.

Method 300 continues at step 304 with the BTS making a first determination that at least a first threshold number of mobile stations have sent increase request within a first request window. In an exemplary embodiment, the first threshold number may be one. In another embodiment, the first threshold number may be half of a number of all mobile stations being served on the sector/carrier.

The first request window is a period of time. In an embodiment, the first request window might be, for example, five-hundred milliseconds. Those having skill in the art will recognize that any other first threshold number and/or first request window may be suitable without departing from the scope of the claims.

By making a first determination that at least a first threshold number of mobile stations have sent increase request within a first request window, the BTS may determine a rate. For example, if the first threshold number is one, and the first request window is five-hundred milliseconds, the BTS may make a first determination if it receives an increase request from at least one mobile station within five-hundred milliseconds. Alternatively, if the first threshold number is half of the number of all mobile stations being served on the sector/carrier, the BTS may make a first determination if it receives an increase request from at least half of all the mobile stations being served on the sector/carrier within five-hundred milliseconds.

In an exemplary embodiment, the first determination might be made at fixed intervals. For example, if the first request window is one hour, the first determination might be made on the hour, e.g., 1:00 p.m., 2:00 p.m., etc. In another exemplary embodiment, the first determination might be made continuously, perhaps on a rolling basis. For example, if the first request window is one hour, and the current time of day is 2:36 p.m., the BTS may make a first determination if at least a first threshold number of mobile stations have sent an increase request between 1:36 p.m. and 2:36 p.m.

In an exemplary embodiment, the first threshold number and/or the first request window may be fixed across determinations. In another exemplary embodiment, the first threshold number and/or the first request window may increase and/or decrease across determinations. For example, if the BTS makes a first determination and increases a power level of a forward-link overhead channel, then the first threshold number may be increased for subsequent determinations, and/or the first request window may be decreased for subsequent determinations. And other alterations and iterations of the first threshold number and/or the first request window may be made as well.

The method continues at step 306 with the BTS, in response to making the first determination, increasing the power level of the forward-link overhead channel. In an exemplary embodiment, increasing the power level may comprise increasing the power level by a half decibel. In another embodiment, increasing the power level may comprise doubling the power level. And other possibilities exist as well.

Increasing the power level may comprise increasing the power level by an amount determined by the BTS. Or increasing the power level may comprise increasing the power level by an amount determined by another network entity connected to the BTS, such as BSC 106 of FIG. 1. Additionally or alternatively, increasing the power level may comprise increasing the power level by an amount determined by a mobile station. Those having skill in the art will recognize that any entity may be capable of determining the amount by which to increase the power level.

Increasing the power level may be conditioned on not exceeding a maximum power level. In an exemplary embodiment, if the power level of the forward-link overhead channel is already at the maximum power level, then the power level will not be increased. In another exemplary embodiment, if the power level of the forward-link overhead channel is below a maximum power level, but increasing the power level by a determined amount would increase the power level above the maximum power level, then the power level is increased to the maximum power level, but not above the maximum power level. And other variations are possible as well.

In an exemplary embodiment, the BTS may determine that less than a second threshold number of mobile stations have sent an increase request within a second request window, and responsively set the power level of the forward-link overhead channel to a default setting. In an exemplary embodiment, the second threshold number may be the same as the first threshold number. In another exemplary embodiment, the second threshold number may be less than or greater than the first threshold number.

If the second threshold number is less than the first threshold number, then the BTS may not immediately set the power level of the forward-link overhead channel to the default setting. For example, if the first threshold number and the second threshold number were the same, and the first request window and the second request window were the same, then as soon as less than the first/second threshold number of mobile were to send an increase request within the first/second request window, the BTS may set the power level of the forward-link overhead channel to a default setting. This may immediately cause more than a first/second threshold number of mobile stations to send an increase request within the first/second request window, causing the BTS to increase the power level of the forward-link channel above the default setting. After the BTS has increased the power level of the forward-link channel, less than the first/second threshold number of mobile stations may send an increase request within the first/second request window, causing the BTS to repeat the process of setting the power level of the forward-link channel to the default setting. If the second threshold number is less that the first threshold number, and/or the second request window is greater than the first request window, then the BTS may not perform a rapid sequence of power increases and power decreases.

Figure 4:
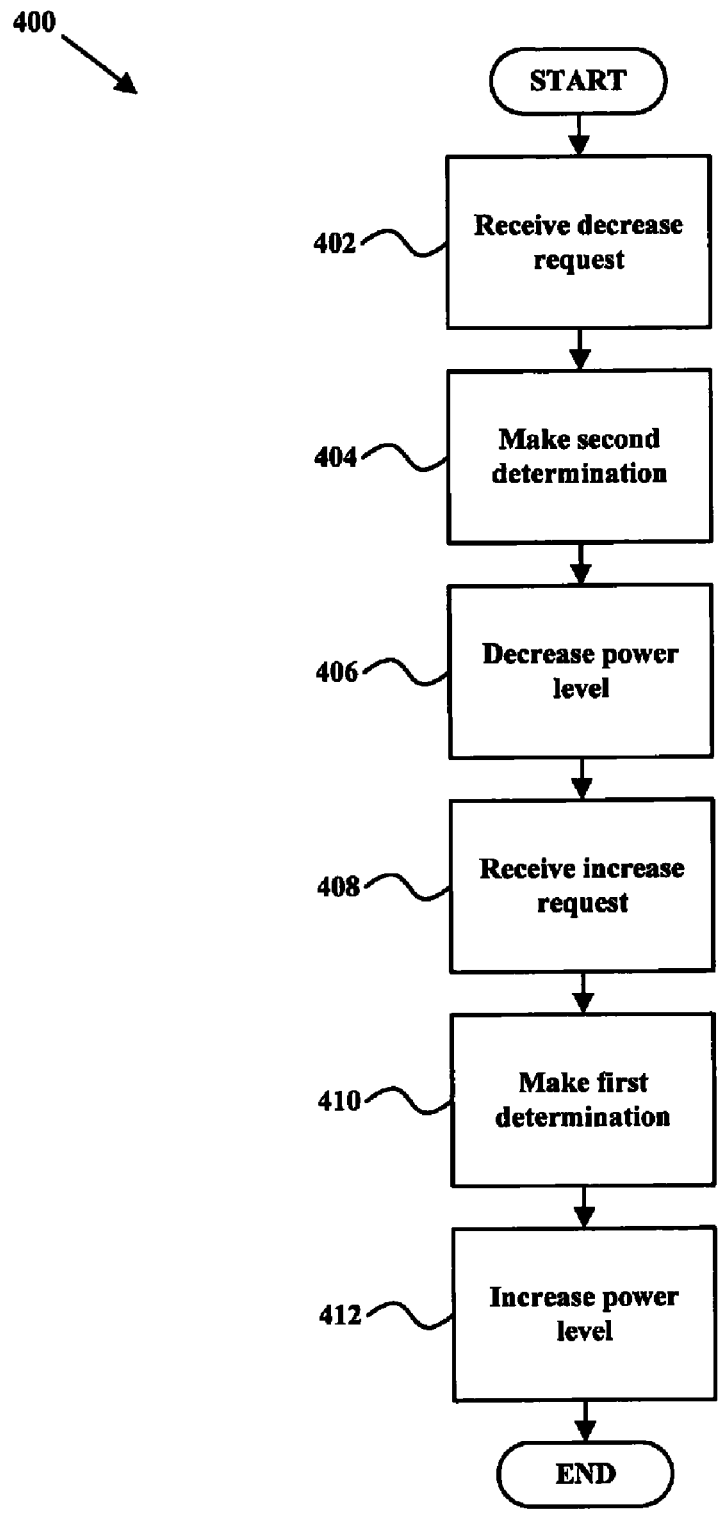
FIG. 4 is a flowchart of a method, in accordance with exemplary embodiments.

FIG. 4 depicts a flowchart of a method, in accordance with exemplary embodiments. As shown in FIG. 4, method 400 begins at step 402 with the BTS receiving from at least one mobile station a decrease request. The decrease request is a request that the BTS decrease a power level of a forward-link overhead channel. The method continues at step 404 with the BTS making a second determination that at least a second threshold number of mobile stations have sent a decrease request within a second request window. The second request window is a period of time. The method then continues at step 406 with the BTS, in response to making the second determination, decreasing the power level of the forward-link overhead channel. Steps 402, 404, and 406 may be performed in a manner similar to steps 302, 304, and 306, respectively, as described with respect to method 300, except that the BTS receives a decrease request, rather than an increase request, and decreases, rather than increases, a power level.

Method 400 continues at step 408 with the BTS receiving from at least one mobile station an increase request. The method then continues at step 410 with the BTS making a first determination that at least a first threshold number of mobile stations have sent an increase request within a first request window. The method continues at step 412 with the BTS, in response to making the first determination, increasing the power level of the forward-link overhead channel.

As noted above, the use of "first determination" and "second determination" is not intended to represent the order that the determinations should be made, but is intended only to distinguish the determinations. Therefore, as demonstrated by exemplary method 400, the BTS may, in response to making a second determination, decrease a power level, and subsequently, in response to making a first determination, increase the power level.

b. Mobile Station

Figure 5:
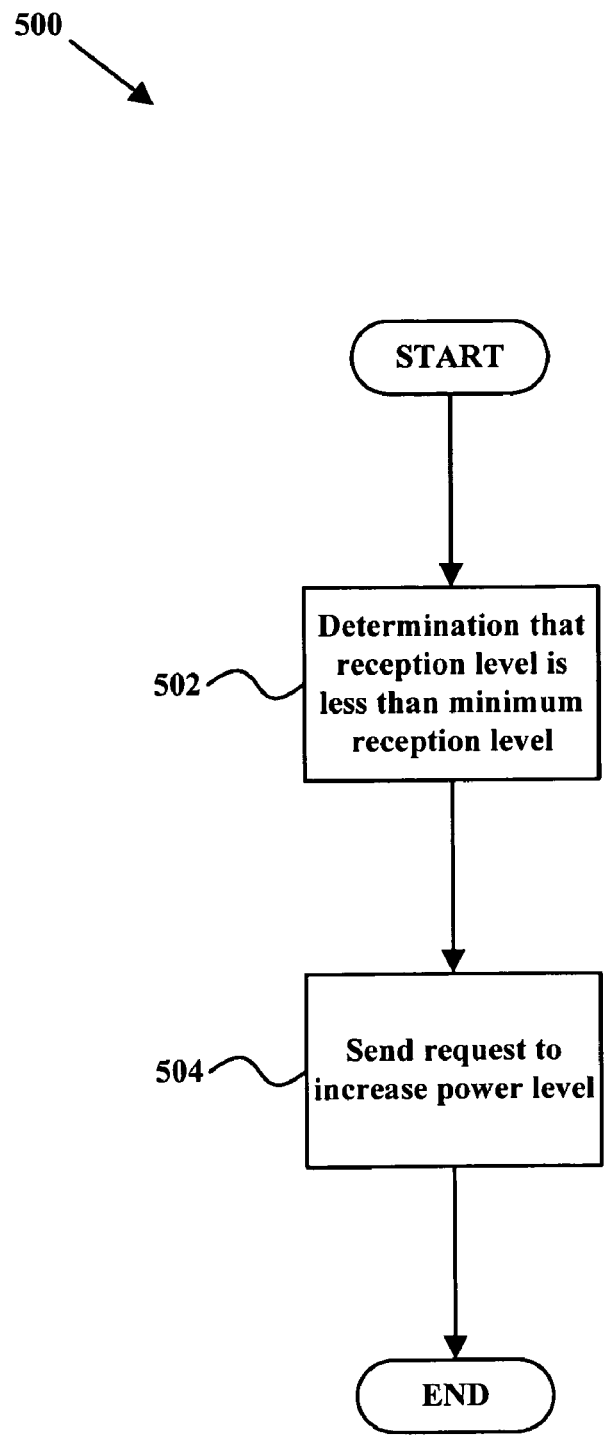
FIG. 5 is a flowchart of a method, in accordance with exemplary embodiments.

FIG. 5 depicts a flowchart of a method, in accordance with exemplary embodiments. As shown in FIG. 5, method 500 begins at step 502 with a mobile station making a first determination that a reception level of a forward-link overhead channel of a BTS serving the mobile station is less than a minimum reception level. The mobile station could be, for example, mobile station 102 depicted in FIG. 1. The BTS could be BTS 104 depicted in FIG. 1.

The forward-link overhead channel may be, for example, a forward-link sync channel and/or a forward-link paging channel. Those having skill in the art will recognize, however, that the forward-link overhead channel is not limited to the exemplary sync and paging channels.

In an exemplary embodiment, the minimum reception level could be a minimum signal power level of the forward-link overhead channel. For example, in an embodiment, the mobile station may make a first determination if the signal power is so weak that the mobile station cannot properly receive a signal from the forward-link overhead channel. In another exemplary embodiment, the mobile station may make a first determination if the signal power falls below a certain fixed threshold, even if the mobile station can properly receive the signal.

Method 500 continues at step 504 with the mobile station, in response to making the first determination, sending to the BTS a request to increase a power level of the forward-link overhead channel. The request to increase might be sent, for example, over an access channel or any other channel suitable for sending the request. Further, the request need not be sent over an overhead channel, nor does the request need to be sent over a "channel," but can instead be sent in any manner suitable for sending the request.

In an exemplary embodiment, the mobile station may make a second determination that the reception level of the forward-link overhead channel of the BTS is greater than a maximum reception level, and in response to making the second determination, send to the BTS a request to decrease the power level of the forward-link overhead channel.

In an exemplary embodiment, the maximum reception level could be a maximum signal power level of the forward-link overhead channel. For example, in an embodiment, the mobile station may make a second determination if the signal power is so strong that the mobile station cannot properly receive a signal from the forward-link overhead channel. In another exemplary embodiment, the mobile station may make a second determination if the signal power increases above a certain fixed threshold, even if the mobile station can properly receive the signal.

3. Conclusion

Various exemplary embodiments have been described above. Those skilled in the art will understand, however, that changes and modifications may be made to those examples without departing from the scope of the claims.

The invention claimed is:

1. A method comprising:
a base transceiver station (BTS) receiving from at least one mobile station an increase request, each increase request requesting that the BTS increase a power level of a forward-link overhead channel;
the BTS making a first determination that at least a first threshold number of mobile stations have sent an increase request within a first request window, wherein the first request window is a period of time; and
the BTS, in response to making the first determination, increasing the power level of the forward-link overhead channel.

2. The method of claim 1, wherein the forward-link overhead channel is a forward-link sync channel.

3. The method of claim 1, wherein the forward-link overhead channel is a forward-link paging channel.

4. The method of claim 1, wherein the first threshold number is one.

5. The method of claim 1, wherein the BTS provides service to a plurality of mobile stations over a sector/carrier, wherein receiving an increase request comprises receiving an increase request from a mobile station being served on the sector/carrier, and wherein the first threshold number is half of a number of all mobile stations being served on the sector/carrier.

6. The method of claim 1, wherein the first request window is five-hundred milliseconds.

7. The method of claim 1, wherein increasing the power level comprises increasing the power level by a half decibel.

8. The method of claim 1, wherein increasing the power level comprises doubling the power level.

9. The method of claim 1, wherein increasing the power level is conditioned on not exceeding a maximum power level.

10. The method of claim 1, further comprising:
the BTS receiving from at least one mobile station a decrease request, each decrease request requesting that the BTS decrease the power level of the forward-link overhead channel;
the BTS making a second determination that at least a second threshold number of mobile stations have sent a decrease request within a second request window, wherein the second request window is a period of time; and
the BTS, in response to making the second determination, decreasing the power level of the forward-link overhead channel.

11. The method of claim 1, further comprising the BTS determining that less than a second threshold number of mobile stations have sent an increase request within a second request window, wherein the second request window is a period of time, and responsively setting the power level of the forward-link overhead channel to a default setting.

12. The method of claim 11, wherein the second threshold number is less than the first threshold number.

13. A base transceiver station (BTS) comprising:
a wireless-communication interface;
a processor; and
data storage comprising instructions executable by the processor to:
receive from at least one mobile station an increase request, each increase request requesting that the BTS increase a power level of a forward-link overhead channel;
make a first determination that at least a first threshold number of mobile stations have sent an increase request within a first request window, wherein the first request window is a period of time; and in response to making the first determination, increase the power level of the forward-link overhead channel.

14. The BTS of claim 13, wherein the forward-link overhead channel is a forward-link sync channel.

15. The BTS of claim 13, wherein the forward-link overhead channel is a forward-link paging channel.

16. The BTS of claim 13, wherein the data storage further comprises instructions to provide service to a plurality of mobile stations over a sector/carrier, wherein the instructions to receive an increase request comprise instructions to receive an increase request from a mobile station being served on the sector/carrier, and wherein the first threshold number is half of a number of all mobile stations being served on the sector/carrier.

17. The BTS of claim 13, wherein the first request window is five-hundred milliseconds.

18. The BTS of claim 13, wherein the instructions to increase the power level comprise instructions to increase the power level by a half decibel.

19. The BTS of claim 13, wherein the instructions to increase the power level comprise instructions to increase the power level conditioned on not exceeding a maximum power level.

20. The BTS of claim 13, wherein data storage further comprises instructions to:
receive from at least one mobile station a decrease request, each decrease request requesting that the BTS decrease the power level of the forward-link overhead channel;
make a second determination that at least a second threshold number of mobile stations have sent a decrease request within a second request window, wherein the second request window is a period of time; and
in response to making the second determination, decrease the power level of the forward-link overhead channel.

21. The BTS of claim 13, wherein the data storage further comprises instructions to determine that less than a second threshold number of mobile stations have sent an increase request within a second request window, wherein the second request window is a period of time, and responsively set the power level of the forward-link overhead channel to a default setting.

22. A method comprising:
a mobile station making a first determination that a reception level of a forward-link overhead channel of a base transceiver station (BTS) serving the mobile station is less than a minimum reception level; and
the mobile station, in response to making the first determination, sending to the BTS a request to increase a power level of the forward-link overhead channel.

23. The method of claim 22, wherein the forward-link overhead channel is a forward-link sync channel.

24. The method of claim 22, wherein the forward-link overhead channel is a forward-link paging channel.

25. The method of claim 22, further comprising:
the mobile station making a second determination that the reception level of the forward-link overhead channel of the BTS is greater than a maximum reception level; and
the mobile station, in response to making the second determination, sending to the BTS a request to decrease the power level of the forward-link overhead channel.

* * * * *